United States Patent Office 3,252,117
Patented May 17, 1966

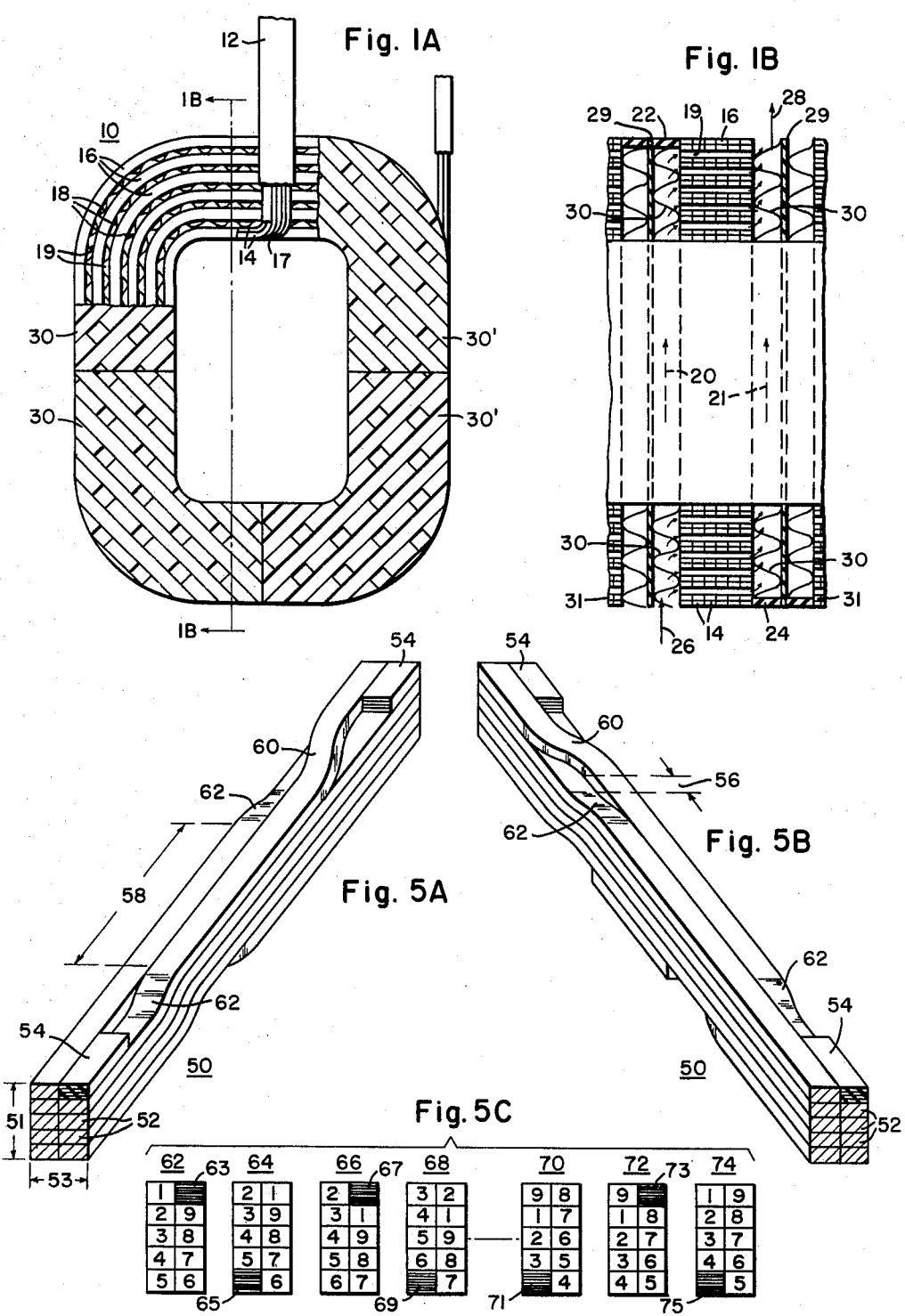

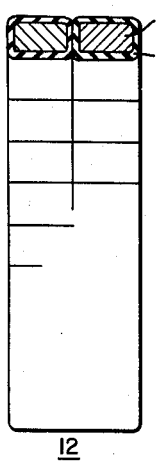
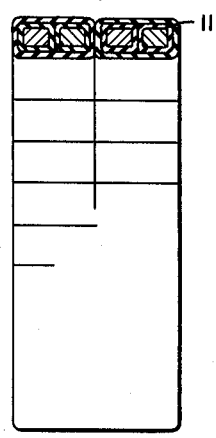
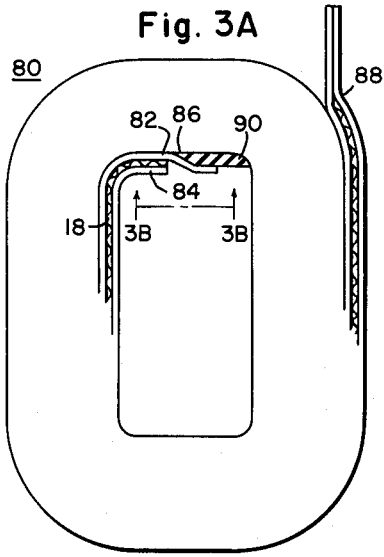
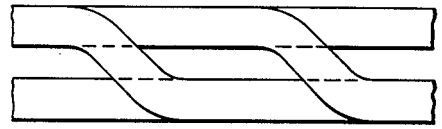
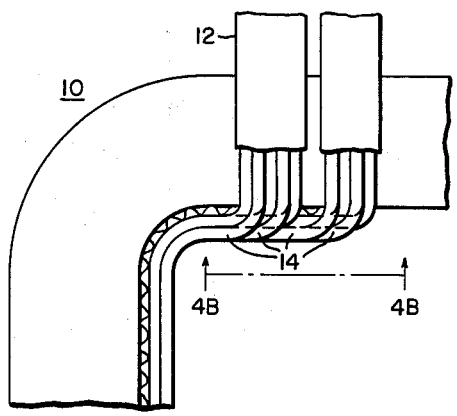
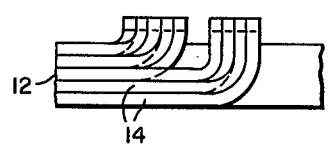

3,252,117
TRANSPOSED WINDING AND INSULATION ARRANGEMENT FOR ELECTRICAL APPARATUS
Heinz G. Fischer, Sharpsville, Pa., assignor to Westinghouse Electric Corporation, East Pittsburgh, Pa., a corporation of Pennsylvania
Filed May 21, 1962, Ser. No. 196,089
5 Claims. (Cl. 336—187)

This invention relates to windings for electrical inductive apparatus, such as transformers, and more particularly to an arrangement of insulation and conductors in the windings of such apparatus.

A method commonly used to construct windings for inductive apparatus is to form a flat disc or pancake type coil from a main conductor comprising a plurality of strands or conducting elements. When the current requirement of the apparatus is high, a sufficient number of these thin pancake coils are connected in a parallel circuit relationship to provide the necessary quantity of conducting material, or the number of strands per conductor has to be increased and the coils are connected in a series circuit relationship. In both cases a multiplicity of brazed joints are necessary to connect the individual coils. The plurality of parallel or series connected coils are separated by thin spacers or washers which give support to the coils and still provide channels or paths which allow a cooling medium to flow in thermal communication with the coils.

When the current requirement of an inductive electrical apparatus is high, it would result in lower manufacturing costs if the winding could be constructed of coils having a larger quantity of conducting material, making it unnecessary to have a multiplicity of brazed joints. However, other problems must be solved if a coil having a large quantity of conducting material is to be as efficient as a plurality of conventional coils connected in a parallel or series circuit relationship.

One such problem is the fact that eddy current losses in a copper conductor of an inductive apparatus, such as a transformer winding, vary with the square of the dimension of the conductor at right angles to the direction of the leakage flux, which in the case of the interleaved type of winding, is approximately at right angles to the axis of the winding or in the plane of the winding coils. To improve efficiency of the electrical inductive apparatus, these eddy current losses are reduced in magnitude by subdividing the required conductor area into a plurality of parallel connected conducting elements or strands, which thereby reduces the dimension of the conductor at right angles with the direction of the leakage flux. The conducting strands or subdivided conductor elements are insulated from each other with paper, enamel, or other suitable insulation, and the several strands are wrapped or taped together to form a single conductor structure from which a coil is wound. Although the method just described reduces the eddy current losses in the windings of a transformer, there is an offsetting increase in losses due to circulating currents between the parallel connected strands or subdivided conducting elements. Losses due to circulating current in a winding whose coils are formed from parallel connected strands can be reduced by transposing the relative position of the strands with respect to the direction of the leakage flux. This transposing of the strands prevents some strands from being longer than others when they are wound concentrically, and averages out the fact that the self inductance caused by leakage flux is different in the individual strands.

Where the number of strands is small, as in the commonly used pancake type coil, the transposition of the strands can be easily accomplished. However, where high currents must be carried by the winding, several strands must be used and the transposition of the strands presents a greater problem. Cables with a multiplicity of transposed strands which are currently available have many disadvantages in that the conducting structure or cable dimensions increase at the transposition points and the strands spring apart and rub the edges of adjacent strands when the conducting structure or cable is bent with a small radius. It is, therefore, desirable to provide a winding for electrical inductive apparatus having a high current capacity and a plurality of conducting strands. The winding should have a new and improved transposition method to reduce losses due to eddy currents and circulating currents, and at the same time present a high degree of safety from short circuits between adjacent strands in the conducting structure or cable.

Further, since the coil having a large quantity of conducting material is thicker than the conventional pancake coils, cooling the coils becomes a major problem. The method commonly used to insulate adjacent pancake type coils involves cutting diamond or rectangular blocks from a fibrous material and gluing them in a definite predetermined pattern on a thin board formed of a fibrous material. This insulating board or washer insulates and supports adjacent coils and still allows a path for flow of the cooling medium between the coils. This process of constructing the insulating washer, however, is slow and expensive. It is, therefore, desirable to provide a winding for electrical inductive apparatus having a high current capacity and a plurality of conducting strands that has a new and improved cooling method and a new and improved insulating washer to separate the adjacent coils in the winding.

It is an object of this invention to provide a new and improved winding for electrical apparatus.

Another object of this invention is to provide a new and improved winding for electrical apparatus including a coil formed from subdivided conductors or strands.

A further object of this invention is to provide a winding for electrical apparatus having a greater efficiency by reducing the eddy-current losses in the winding and by reducing the losses due to circulating current between the parallel connected strands included in the coils of the winding.

A still further object of the invention is to provide a winding for electrical apparatus having an improved insulation arrangement and more efficient path for the flow of the cooling medium.

Briefly, the present invention accomplishes the above cited objects by providing a winding for electrical apparatus which is suitable for high currents without brazing a multiplicity of coil sections in parallel or series.

The coil is comprised of a large number of conducting strands per conducting structure and is provided with an improved method for transposing the conducting strands. It is also provided wtih a new and improved method for cooling the coil turns and a new insulating washer for insulating adjacent coils and provide an improved path for flow of a cooling medium.

Further objects and advantages of the invention will become apparent as the following description proceeds and features of novelty which characterize the invention will be pointed out in particularity in the claims annexed to and forming a part of this specification.

For a fuller understanding of the nature and objects of the invention, reference should be had to the following detailed description taken in connection with the accompanying drawings, in which:

FIG. 1A is a plan view of a coil of the type in which this invention may be employed;

FIG. 1B is a cross-sectional view, taken on line 1B—1B of FIG. 1A, showing the relative locations of the conductors and insulating members, and the cooling method employed in this invention;

FIGS. 2A and 2B are cross-sectional views showing construction of main conductors that may be used to form the coil of FIGS. 1A and 1B;

FIG. 3A is a plan view of a coil showing a coil turn formed of a plurality of conductors;

FIG. 3B shows the cross point between two coils;

FIGS. 4A and 4B show how the starting length of a coil is brought out and how the strands are bent to form the starting length;

FIGS. 5A and 5B are right and left-hand isometric views showing the transposition method used in the coil of FIGS. 1A and 1B;

FIG. 5C shows the transposition sequence of the subdivided conductors within the coil of FIG. 1;

Figure 6A:
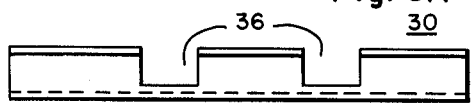
FIGS. 6A, 6B and 6C show the side elevation, top plan view and end elevation respectively of an insulating member which is used to insulate adjacent coils.

Referring to FIG. 1A of the drawings, a coil 10 of the type shown may be formed from a main conductor 12 comprising a plurality of parallel connected strands or subdivided elements 14. FIG. 2A shows a cross section of the main conductor 12 shown in FIG. 1A, illustrating in greater detail the plurality of parallel connected strands 14 and the strand insulating material 15. If desired, a subdivided strand 11, as shown in FIG. 2B may be used instead of the single wire strand 14. The subdivided strand 11 may be used to increase the current capabilities of the coil 10 shown in FIG. 1A without increasing eddy current losses or interfering with the winding procedure. The subdivided strand 11 is handled in the same manner as the single wire strand 14. The strands 14 are insulated from each other by enamel, paper, or other suitable insulation material 15 and the strands 14 are then taped or wrapped together, usually in two layers, to form a solid conducting structure or main conductor 12. Referring again to FIG. 1A, the main conductor 12 is then wound into a coil 10, with each turn 16 of the coil 10 insulated from the adjacent turn 16 by an insulating member 18. When very large currents are to be carried by the coil 10, or for other considerations, it may be desirable to connect a plurality of conductors 12 in parallel. FIG. 3A illustrates a coil 80 with two conductors 82 and 84 connected in a parallel circuit arrangement. The conductors 82 and 84 are crossed at the start 86 and finish 88 connections if more than one coil 80 per winding is used. An insulating material, such as pressboard is used to fill the space 90. FIG. 3B shows the crossing point between two coils viewed from point 3B in FIG. 3A. Connecting a plurality of conductors in parallel also improves the balance in a transformer as it allows a plurality of coils 80 to be connected in a series circuit relation instead of the parallel circuit relation that would be used for coils using a single conductor. An insulating member 18 may be used between the parallel connected conductors 82 and 84. Referring again to FIG. 1A, the insulating member 18 not only serves to insulate adjacent turns 16, but it spaces the turns and provides a path for a cooling medium to flow across the coil and in thermal communication with each coil turns transversely. The thin pancake coils in common use provide for coolant to flow longitudinally only. This transverse or cross-flow of cooling medium through the coil makes possible the use of a coil having a multiplicity of conducting elements, because each conducting element in the main conductor is efficiently and adequately cooled.

The insulating member 18 used to insulate adjacent turns must not only have good insulating qualities, but it must also have the strength to support the turns and still provide an adequate path for flow of a cooling medium. A fibrous material, shaped into continuous corrugations, has been found to provide these necessary qualities and is very easy and economical to manufacture. FIG. 1A also shows quarter sections of a new insulation member 30 and 30' used to support and insulate adjacent coils. This insulating spacer washer 30 and 30' will be described in detail hereinafter.

Where one, or an odd number of these cross flow type coils are used per winding group, the start conductor is brought out, as illustrated by conductor 12 in FIG. 1A. The standard type coil in use today commonly uses a prepared conductor, consisting of a plurality of insulated and transposed strands, brazed to the coil start 17. The transpositions are necessary in this prepared conductor because when the prepared conductor crosses the coil 10 adjacent to the turns 16, the prepared conductor is subjected to a very strong stray field, and because of the relatively short distance between the brazed joint of the prepared conductor to the coil start and the brazed joint to a bushing cable or similar connection.

The design characteristics of the cross flow type coil, however, make the use of a separate prepared conductor and the accompanying brazed joint unnecessary. The cross flow type coil has a very long strand length per coil and the resistance of the strand loop is, therefore, relatively high. This higher resistance makes it practical to use the strands from the conductor that forms the coil to take the place of the prepared conductor, and transposition of the strands is unnecessary during this starting length. FIG. 4A shows in detail how the strands 14 are brought out to form the starting length of the conductor 12 for the coil 10. The strands 14 are bent so the two layers of strands 14 that form conductor 12, form one layer of wires while crossing the turns 16 of the coil 10. FIG. 4B shows the bending of the strands 14 of the conductor 12 to form one layer, viewed from point 4B—4B in FIG. 4A.

FIG. 1B in a cross-section, taken on line 1B—1B of FIG. 1A, with the relative location of adjacent coils 31, insulating spacer washers 30, and flat pressboard washers 29 shown to illustrate the cooling medium flow path in detail. The coolant enters the coil at arrow 26 and leaves at arrow 28. To insure that the coolant transverses the coil through passageways 19 formed by the insulating members 18, the upper end of longitudinal passage 20 is blocked with a suitable member 22. The other longitudinal passageway 21 is blocked at the lower end with a member 24. With this arrangement of passageways, the cooling medium is forced to flow into the coil longitudinally at arrow 26 and along passage 20 formed by insulating spacer washer 30. Adjacent coils 31 are separated by a flat washer 29 formed or pressboard or other suitable material. Since passage 20 is blocked by member 22, the coolant can only flow through the openings 19 between the turns 16 provided by the insulating spacers 18. When the coolant reaches passage 21, it cannot flow downward because of blocking member 24. Therefore, the coolant must flow through insulating spacer washer 30 and from the coil at arrow 28. It can readily be seen from FIG. 1B that this cross-flow cooling arrangement causes the cooling medium to come into thermal communication with every conducting strand, and, therefore, making possible the use of a large number of conducting strands and hence the design of a very high current coil.

To accomplish this cross-flow cooling design, an insulating spacer or washer 30 and 30' was developed to insulate and space adjacent coils and at the same time provide the passageways 20 and 21, shown in FIG. 1B. It is not only desirable that this insulating washer adequately insulate adjacent coils but it must provide the shortest free copper length, or distance between adjacent supports, to give support to the coil turns under normal and short circuit conditions. However, the obtaining of the shortest possible free copper length should not be accomplished at the expense of covering a large percentage of the coil surface with the insulating washer, as this would unduly hinder the flow of cooling medium.

A method commonly used to form these insulating washers consists of cutting specially shaped blocks from a fibrous material and gluing them to a fiber board in a predetermined pattern. This process is laborious and results in a spacer washer that produces a free copper length of two and three-quarter inches and covers approximately twenty percent of the coil surface.

Figure 6C:
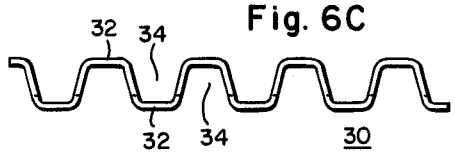
Figure 6B:
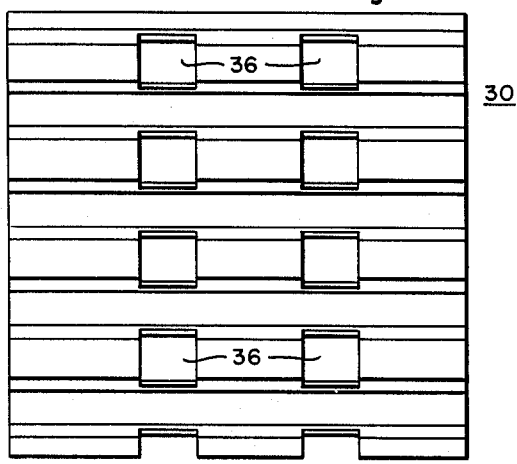
Figure 7A:
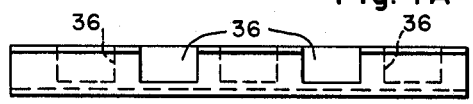
FIGS. 7A, 7B and 7C show another embodiment of the invention.
Figure 7C:
Figure 7B:
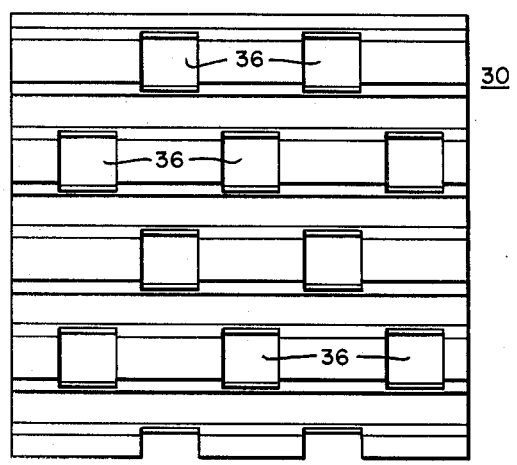

FIGS. 6A, 6B and 6C show a new spacer washer 30 developed for use in the cross-flow coil. This new spacer washer 30 completely eliminates the cutting and gluing of blocks. The washer consists of a heavy insulating board 30, corrugated or folded and shaped into parallel ridges and furrows so as to form a wavy surface. Points 32 on the spacer washer 30 contact and support adjacent coils and the cooling medium flows in the channels 34. To allow the cooling medium to flow transversely to the insulating spacer, as well as longitudinally, and hence allow all the cooling medium to transverse the coil, the washer 30 must have a suitable number of openings 36, as shown in FIGS. 6A and 6B. The openings 36 in the spacer washer 30 may be milled, punched, sawed or performed in some other suitable manner. If the openings 36 in the spacer 30 are formed by a saw cut, the openings 36 will be in line across the washer 30, as shown in FIGS. 6A and 6B. If the openings 36 are formed by punching, or by some other suitable method, the openings 36 may be placed in any desirable pattern, as shown in FIGS. 7A, 7B and 7C.

The spacer washer 30 not only provides an insulator between adjacent coils that is inexpensive and easy to manufacture, but it presents greater support to the coil turns with less hindrance to the flow of coolant than the conventional spacer washer. Using the new design spacer washer 30, the free copper length is reduced as opposed to the conventional washer. Also, the coil surface has less area covered when using the corrugated spacer washer 30 than when using the conventional washer.

Figure 8:
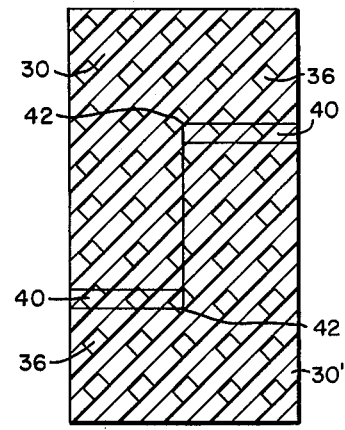
FIG. 8 shows how the insulating member used to insulate adjacent coils may be cut from one sheet of insulating material.

FIG. 8 shows an additional advantage of the new corrugated washer 30 as quarter sections 30 and 30' of the washer 30 may be cut from one large sheet of material 41. FIG. 8 shows how the cut should be made if a radius 42 is desired on the washer. The strips 40 are the only excess material. FIG. 1A shows the quarter sections 30 and 30' and how they are placed relative to the coil 10.

FIG. 1B shows the individual conducting strands 14, which, as pointed out previously are necessary to reduce eddy current losses. The large number of strands 14 and the efficient cross-flow method of cooling the conducting strands allows the construction of a single high current coil 10. However, to reduce circulating currents caused by the large number of parallel connected conducting strands 14, the strands 14 must be transposed, or continuously shifted about the main conductor 12 or cable axis without twisting the strands 14, and so that each strand 14 successively occupies the same position as is occupied by all the other strands 14.

One type of transposition, commonly used with a multiplicity of strands, is called the complete transposition. It involves two layers of conductors, with all conductors moving at a common transposition point to the opposite layer and in the mirror image of its original location. In other words, the strand in the upper left corner of one layer of strands would move to the lower right corner of the adjacent layer of strands and the strand in the upper right corner would move to the lower left corner. This process is followed for all the strands. The complete transposition, however, causes a bulging of the main conductor at the transposition point and causes edge-to-edge contact of the strands, making necessary the placement of additional insulation of these points. Also, it is difficult to bend the main conductor in a small radius and impractical to perform the transposition automatically by a bending machine, as the bending angles differ for each strand, depending upon the number of strands used.

Another transposition, commonly called the full transposition, involves two layers of conducting strands, with several transposition points required to complete one full transposition. With this method, each strand moves to the space occupied previously by the adjacent strands. This process is repeated at successive intervals until each strand has occupied the same position as is occupied by all the other strands. Cable presently available using the full transposition has disadvantages in that there is a bulging of the cable at each transposition point and there is an edge-to-edge contact between some of the strands. Edge-to-edge contact of the strands should be avoided if a high degree of safety from short circuits is desirable. When the cable is bent into a coil, the pressure is increased at these edge-to-edge contacts and when the coils are pressed during assembly or stressed due to short circuits while in operation it is highly probable that the protective insulation will eventually become ineffective. This cable is also difficult to bend flat in a small radius because of a tendency of the strands to spring apart and distort the cable.

The transposition method developed for use in the cross-flow coil previously described eliminates the disadvantages of the method just discussed. FIGS. 5A and 5B show right and left-hand isometric views of a main conductor 50 with the strands transposed according to the principles of the new method. FIG. 5C shows the sequence that may be followed to accomplish the transposition. In particular, a horizontal bend is made changing conducting strand 1 from one layer or row of strands to the other layer or row. Strand 1 is moved into a blank space 63 available in the adjacent layer because an old number of strands is used to form the main conducting structure. This movement of conductor 1 can be seen in cross-sectional views 62 and 64 of FIG. 5C. Then, the conductive strands 2, 3, 4, and 5. remaining in the layer vacated by strand 1, are simultaneously bent one conductor space in a vertical direction. Strand 2 takes the place formerly occupied by strand 1, strand 3 occupies the place previously occupied by strand 2, strand 4 occupies the place previously occupied by strand 3, and strand 5 occupies the place previously occupied by strand 4. This process leaves a blank space 65 as shown in cross-section 64 of FIG. 5C. At the next transition, point, the blank space 65 is filled by strand 6, which is bent horizontally, and the strands 1, 9, 8 and 7 remaining in the layer formerly occupied by strand 6 are bent in a vertical direction, leaving a blank space 67 as shown in cross-section 66 of FIG. 5C. This process is repeated until one full transposition has has been completed, as shown in cross-section 74. FIG. 5C illustrates the first four, and the last three transposition points of one complete transposition. The broken line between transposition points 68 and 70 indicates the established sequence is to be followed between these points. As many full transpositions of this type may be used per cross-flow coil as may be found desirable.

Although, the above description outlines a transposition where the individual strands move about the main conductor axis in a clockwise direction, as shown in FIG. 5C, it is not meant to be so limited. For instance, the first step in the transposition could be a vertical bend by conductors 9, 8, 7 and 6, as shown in cross-section 62 of FIG. 5C, thus filling the vacancy 63. The next step would then be a horizontal bend by conductor 5 into the next layer and the space previously occupied by strand 6. With this method, the strands would rotate counterclockwise about the main conductor axis.

To maintain dimensions 51 and 53 uniform throughout the length of the main conductor or cable 50, an odd number of conducting strands 52 are used, with the blank space between transposition points occupied with a filler piece 54 or strip, such as pressboard. Using a filler 54, the cable 50 can maintain a uniform shape throughout its length, whether or not there is a transposition, and the dimensions of the cable will not change. In summary, an odd number of conductors are used so that the first bend always moves a strand into the vacant space, leaving a vacant space for other conductors, and therefore, allowing all the bends to be made without creating a bulge in the conducting structure.

From FIG. 5C, it can be seen that at each transposition point, only one conducting strand 52 changes from one layer to another, with the other bends being made within one of the layers. As pointed out previously, this conducting strand always moves into a vacant space which is present because of the odd number of conducting strands. Then the remaining conducting strands, in the layer just vacated by the strands moving to the other layer, all simultaneously move one space, thus filling the newly vacated space and creating a space at the other end of the layer. This process is successively repeated until each conducting strand has occupied the space occupied by every other strand, and has made a complete circuit around the axis of the main conductor or cable.

It is very important that all bends 62 performed in the same layer and all bends 60 moving a strand from one layer to the next be made over a very short distance and not gradually. The distance 58, between the point 62 where all strands are simultaneously bent in one layer, to the point 62 where all strands are simultaneously bent in the other layer, depends upon the number of transpositions required in one coil. However, this distance should not be too small. For example, in one coil design it was found that a minimum distance 58 of three inches was required. The distance between the bend where one strand 52 changes layers or the horizontal bend 60, and the bend where all conductors in one layer are bent or the vertical bend 62, is very critical, and should allow enough space for the strand which changes layers to move back and forth. For one coil design this distance was found to be a minimum of three-quarter inch. During distance 56, all strands 52 have flat surface to flat surface contact and the horizontal transposition or bend 60 can slide back and forth when the main conductor 50 is bent flat, even over a radius as small as 2 inches, without an edge-to-edge contact and resultant insulation scraping.

With this transposition method, all horizontal bends 60 are identical and all vertical bends 62 are identical. Therefore, the angle of the bends is dependent only on the size of the conducting strand 52 and not on the number of conducting strands used. This makes it practical to accomplish the bends in a transposing machine. Also, by accurately bending each strand over a short distance with the same angle, the strands have no tendency to spring out of the main conductor or cable 50 and there is no bulging or change in cable dimension, even when bent flat over a small radius.

It will, therefore, be apparent that there has been disclosed a new and improved winding for electrical apparatus. It is a winding that is capable of carrying high current and yet is efficiently cooled and with low losses due to eddy currents and circulating currents. Also, it is a winding that has an improved insulating arrangement and more efficient path for the flow of cooling medium.

While there have been shown and described what are at present considered to be the preferred embodiments of the invention, modifications thereof will readily occur to those skilled in the art. For example, the coil described in the invention can be used in all windings and machines where a conductor is used which consists of a number of wires that have to be transposed and high degree of safety against wire to wire shorts is desired. Also, since the cross-flow coil is particularly applicable to coils carrying high current, they will generally be used on the low voltage side of inductive apparatus. However, it is not meant to be so limited and the invention is equally applicable to the high voltage side of inductive apparatus. Further, the dimensions given are for illustrative purposes only and are not to limit in any way the subject matter of this invention.

Since numerous changes may be made in the above described apparatus and different embodiments of the invention may be made without departing from the spirit thereof, it is intended that all the matter contained in the foregoing description or shown in the accompanying drawings shall be interpreted as illustrative, and not in a limiting sense.

I claim as my invention:

1. Electric cable comprising an odd numbered plurality of electrically insulated, electrically conductive strands; said strands being arranged into two layers, with a strand at the end of one of said layers projecting past the adjacent layer; said strands being continuously transposed about the main axis of the cable at successive spaced transposition points; each transposition point including a first discrete bend which moves the projecting strand to the adjacent layer, and a second discrete bend which moves each of the strands in the newly vacated layer one strand position in the same layer to fill the newly vacated strand position; said first and second discrete bends at each transposition point being spaced a predetermined minimum distance apart to allow the projecting strand freedom of movement and prevent edge-to-edge contact between said strands when the cable is wound into a coil; said transposition points being spaced to provide a predetermined minimum distance between successive second discrete bends; the length of cable occupied by each of said second discrete bends being substantially less than the distance between successive first discrete bends, to enable the cable to maintain predetermined outer dimensions when wound into a coil; said transposition points being repeated, at least until each strand successively occupies each strand position.

2. Electric cable comprising an odd numbered plurality of electrically insulated, electrically conductive strands; said strands being arranged into two layers, with a strand at the end of one of said layers projecting past the adjacent layer; said strands being continuously transposed about the main axis of the cable at successive spaced transposition points; each transposition point including a first descrete bend which moves the projecting strand to the adjacent layer, and a second discrete bend which moves each of the strands in the newly vacated layer one strand position in the same layer to fill the newly vacated strand position; said first and second discrete bends at each transposition point being spaced at least three-fourths of an inch apart, to allow the projecting strand freedom of movement and prevent edge-to-edge contact between said projecting strand and adjacent strands when the cable is wound into a coil; said transposition points being spaced to provide a distance of at least three inches between successive second discrete bends; the length of cable occupied by each second discrete bend being substantially less than the distance between successive first discrete bends; to enable the cable to maintain predetermined outer dimensions when wound into a coil; said transposition points being repeated, at least until each conductive strand successively occupies each strand position.

3. A coil for a transformer comprising a main conductor having an odd numbered plurality of electrically insulated, parallel connected, electrically conductive strands; said strands being arranged into two layers leaving a strand at the end of one of said layers projecting past the adjacent layer; said strands being continuously transposed about the main conductor axis at successive spaced transposition points; each transposition point including first and second types of discrete bends, with said projecting strand moving to the adjacent layer for the first type of discrete bend, and the strands of the newly vacated layer each bending one strand position in the same layer to fill the newly vacated strand position, for the second type of discrete bend; said discrete bends being made over a predetermined maximum distance, with the space required for the first type of discrete bend being substantially less than the distance between successive second types of discrete bends; said first and second types of discrete bends being at least three-fourths of an inch apart at each transportation point, to prevent edge-to-edge contact of the strands when the main conductor is bent flat over a predetermined radius; said transposition points being repeated, at least until each strand successively occupies the positions occupied by all the other strands; the second discrete bends of successive transposition points being at least three inches apart to prevent the conductive strands from springing apart upon winding of the main conductor into a coil; and filler strips having the same cross section as a conductive strand successively disposed adjacent the projecting conductive strand between successive transportation points, to maintain a substantially uniform cross section of the main conductor.

4. A winding for a transformer comprising a plurality of coils each having an opening therein; said coils being stacked in spaced relation with their openings in substantial alignment; each of said coils including a plurality of turns formed from a main conductor having a plurality of electrically insulated, electrically conductive strands; said conductive strands being arranged into layers; said conductive strands being transposed at spaced transposition points about the axis of the main conductor to cause each conductive strand to occupy each strand position; the plurality of turns of each of said coils forming a predetermined plurality of spaced concentric layers of turns, with each layer of turns having a predetermined plurality of turns; said coils each having first and second substantially flat sides which allow access to the spaces between said spaced layers of turns; layer insulating means disposed between said spaced layers of turns in each of said coils; said layer insulating means supporting said spaced layers of turns and providing a flow path for a cooling medium between said spaced layers of turns; a first corrugated insulating spacer member disposed against the first side of each of said coils; a second corrugated insulating spacer member disposed against the second side of each of said coils; said first and second corrugated insulating spacer members each having a plurality of transverse openings therein to provide a cooling medium flow path through said spacer members as well as along the corrugations of said spacer members; means blocking one end of each of said first and second corrugated spacer members to provide a cooling medium flow path from the open end of said first corrugated spacer member along the first side of each coil, between the spaced layers of turns to the second side of each coil, and along the second side of each coil to the open end of said second corrugated spacer member.

5. A winding for a transformer comprising a plurality of coils each having a substantially central opening therein; said coils being stacked in spaced relation, with their central openings in substantial alignment; each of said coils including a plurality of turns formed from a main conductor having an odd numbered plurality of electrically insulated, electrically conductive strands; said conductive strands being arranged into two layers with a strand at the end of one of said layers projecting past the adjacent layer; said strands being continuously transposed about the main axis of the cable at successive spaced transposition points; each transposition point including a first discrete bend which moves the projecting strand to the adjacent layer, and a second discrete bend which moves each of the strands in the newly vacated layer one strand position in the same layer to fill the newly vacated strand position; said first and second discrete bends at each transposition point being spaced a predetermined minimum distance apart to allow the projecting strand freedom of movement and prevent edge-to-edge contact between said projecting strand and adjacent strands when the cable is wound into a coil; said transposition points being spaced to provide a predetermined minimum distance between successive second discrete bends; the length of cable occupied by each of said second discrete bends being substantially less than the distance provided between successive first discrete bends, to enable the cable to maintain predetermined outer dimensions; said transposition points being repeated, at least until each strand successively occupies each strand position; the plurality of turns of each of said coils being arranged to form a predetermined plurality of spaced concentric layers of turns, with each layer of turns having a predetermined plurality of turns, to form coils having first and second substantially flat sides which allow access to the spaces between said spaced layers of turns; layer insulating means disposed between the spaced layers of turns of each of said coils; said layer insulating means supporting said spaced layers of turns and providing a flow path for a cooling medium between said spaced layers of turns; a first insulating spacer member disposed against the first side of each of said coils; a second insulating spacer member disposed against the second side of each of said coils; said first and second insulating spacer members each having a plurality of transverse openings therein to provide a flow path for a cooling medium through said spacer members as well as along the plane of said spacer members; means blocking one end of each of said first and second insulating spacer members to provide a coolant flow path from the open end of said first insulating spacer member along the first side of each coil, between the spaced layers of turns to the second side of each coil, and along the second side of each coil to the open end of said second insulating spacer member.

References Cited by the Examiner

UNITED STATES PATENTS

| | | | |
|---|---|---|---|
| 667,996 | 2/1901 | Schwedtmann et al. | 336—185 X |
| 1,629,469 | 5/1927 | Palueff | 336—187 |
| 1,834,114 | 12/1931 | Wiggens | 336—187 |
| 2,249,509 | 7/1941 | Welch et al. | 174—34 |
| 2,310,684 | 2/1943 | Farry | 336—187 |
| 2,393,037 | 1/1946 | Fielder et al. | 336—187 |
| 2,602,035 | 7/1952 | Camilli et al. | 336—60 X |
| 2,605,311 | 7/1952 | Sauer | 336—185 X |
| 3,014,980 | 12/1961 | Marshal et al. | 174—121 |
| 3,056,071 | 9/1962 | Baker et al. | 336—60 X |
| 3,183,460 | 5/1965 | Bennon | 336—60 X |

ROBERT K. SCHAEFER, *Primary Examiner.*

JOHN F. BURNS, DARRELL L. CLAY, *Examiners.*

T. J. KOZMA, S. H. BOYER, *Assistant Examiners.*